(12) United States Patent
Lamoncha

(10) Patent No.: US 11,584,067 B2
(45) Date of Patent: Feb. 21, 2023

(54) HUMIDITY COMPENSATING ACTIVATOR CONTROL FOR ADDITIVE MANUFACTURING

(71) Applicant: Mark Lamoncha, Columbiana, OH (US)

(72) Inventor: Mark Lamoncha, Columbiana, OH (US)

( * ) Notice: Subject to any disclaimer, the term of this patent is extended or adjusted under 35 U.S.C. 154(b) by 182 days.

(21) Appl. No.: 17/108,344

(22) Filed: Dec. 1, 2020

(65) Prior Publication Data
US 2021/0162654 A1 Jun. 3, 2021

Related U.S. Application Data

(60) Provisional application No. 62/942,307, filed on Dec. 2, 2019.

(51) Int. Cl.
B29C 64/124 (2017.01)
B29C 64/393 (2017.01)
B29C 64/205 (2017.01)
B29C 64/245 (2017.01)
B29C 64/255 (2017.01)
B33Y 50/02 (2015.01)
B29C 64/314 (2017.01)
B33Y 30/00 (2015.01)
B33Y 10/00 (2015.01)
(Continued)

(52) U.S. Cl.
CPC .......... *B29C 64/124* (2017.08); *B29C 64/205* (2017.08); *B29C 64/245* (2017.08); *B29C 64/255* (2017.08); *B29C 64/314* (2017.08); *B29C 64/393* (2017.08); *B33Y 50/02* (2014.12); *B22F 12/57* (2021.01); *B22F 12/90* (2021.01); *B33Y 10/00* (2014.12); *B33Y 30/00* (2014.12)

(58) Field of Classification Search
CPC ... B29C 64/124; B29C 64/314; B29C 64/245; B29C 64/255; B29C 64/393; B29C 64/205; B33Y 10/00; B33Y 30/00; B33Y 50/02; B22F 12/57; B22F 12/90
USPC .......................................... 264/40.1; 425/375
See application file for complete search history.

(56) References Cited

U.S. PATENT DOCUMENTS 9,561,542 B2 2/2017 Ackelid
10,105,876 B2 10/2018 Lind et al.
2001/0030383 A1 10/2001 Swanson et al.
(Continued)

OTHER PUBLICATIONS

Gunther, D. et al., Additive Manufacturing of Casting Tools Using Powder-Binder-Jetting Technology, IntechOpen, Chapter 3, pp. 53-86.

(Continued)

*Primary Examiner* — Joseph S Del Sole
*Assistant Examiner* — Lawrence D. Hohenbrink, Jr.
(74) *Attorney, Agent, or Firm* — Standley Law Group LLP; Jeffrey S. Standley; Adam J. Smith

(57) ABSTRACT

Systems and method for additive manufacturing with humidity compensation are provided. A first reservoir for activator, a second reservoir for binder, and a third reservoir for build material to be deposited within a build box by way of one or more deposit devices are provided. A controller receives data indicating ambient humidity level from a humidity sensor and commands a control device associated with the first reservoir to adjust an amount of activator removed from the first reservoir based on the ambient humidity level.

20 Claims, 3 Drawing Sheets

(51) Int. Cl.
 *B22F 12/90* (2021.01)
 *B22F 12/57* (2021.01)

(56) References Cited

U.S. PATENT DOCUMENTS

| | | |
|---|---|---|
| 2008/0252682 A1 | 10/2008 | Hernandez et al. |
| 2015/0050377 A1 | 2/2015 | Shi et al. |
| 2015/0132425 A1 | 5/2015 | Lacaze et al. |
| 2016/0151840 A1 | 6/2016 | McCoy et al. |
| 2016/0193651 A1 | 7/2016 | Orange et al. |
| 2017/0106595 A1* | 4/2017 | Gunther ................. B33Y 40/00 |
| 2017/0173887 A1* | 6/2017 | Sasaki ................... B29C 64/165 |

OTHER PUBLICATIONS

ExOne 3D Core & Mold Printing, https://www.youtube.com/watch?v=0Q0iHS-9Ti0, Oct. 12, 2018.
3D Sand printer S Max ExOne, https://www.youtube.com/watch?v=r1IJijcpLqg, May 19, 2014.

* cited by examiner

HUMIDITY COMPENSATING ACTIVATOR CONTROL FOR ADDITIVE MANUFACTURING

CROSS-REFERENCE TO RELATED APPLICATIONS

This application claims the benefit of U.S. provisional patent application Ser. No. 62/942,307 filed Dec. 2, 2019, the disclosures of which are hereby incorporated by reference as if fully restated herein.

TECHNICAL FIELD

Exemplary embodiments relate generally to humidity compensating activator control for additive manufacturing.

BACKGROUND AND SUMMARY OF THE INVENTION

Additive manufacturing has become an increasingly popular alternative to traditional, subtractive manufacturing. As additive manufacturing, such as 3-D printing, becomes more widely used, the need for greater precision and consistency has increased.

One exemplary type of additive manufacturing is binder jetting. In binder jetting, a build material, such as sand or aggregate, is typically deposited within a build box. The build material may be pre-deposited, or a print head may deposit the build material, often in a layer by layer manner. The build material may be premixed with an activator or the print head may deposit an activator over the deposited material. The activator may be allowed to soak through the deposited build material. The print head subsequently deposits a binder where the resulting object is to be formed. The binder may be a resin. The binder may be activated by the activator and cause the surrounding build material to be bonded to form a portion of the object.

Typically, a build platform is lowered after each layer of binder is deposited and additional build material is deposited by a recoater. Another layer of activator may be deposited, unless the activator is premixed. Subsequent layers of the binder are deposited where the portions of the object forming the next layer are located. The process is repeated to form the entire object. Once all layers have been completed, the object is excavated. Such excavation typically involves digging, blowing away, grinding, breaking apart, or the like. Example of such additive manufacturing machines are those made by ExOne of North Huntington, Pa. (https://www.exone.com/). Such additive manufacturing processes and machines may be used in the foundry industry to create sand cores, such as for use with subsequent casting efforts, for example.

Humidity may affect the material properties of the build material. For example, an increase in humidity may cause certain build materials to clump or otherwise stick together. Build material, such as sand and aggregate, are particularly susceptible to such clumping during relatively high humidity conditions. This may affect the properties of the object being manufactured. This may, alternatively or additionally, affect the properties of the remaining build material which needs to be excavated to extract the object.

What is needed is a system and method for controlling the amount of activator used based on ambient humidity levels during additive manufacturing. Systems and methods for controlling the amount of activator used based on ambient humidity levels during additive manufacturing are provided.

A controller may be configured to take humidity readings from one or more humidity sensors. The controller may be configured to determine the amount of activator for deposit by a deposit device based upon the humidity readings. The controller may determine the amount of activator to be deposited by way of a database which may comprise amounts of activator to be deposited for a number of humidity levels or ranges. In exemplary embodiments, the higher the humidity level, the less activator may be deposited. The lower the humidity level, the more activator may be deposited. In this way, the moisture in the air, which may act as an activator, may be compensated for to give more consistent results, conserve activator, and permit proper drainage of excess building material. The amount of activator used may be selected to cause the remaining build material to flow easily through a drainage system and/or to be easily excavated.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
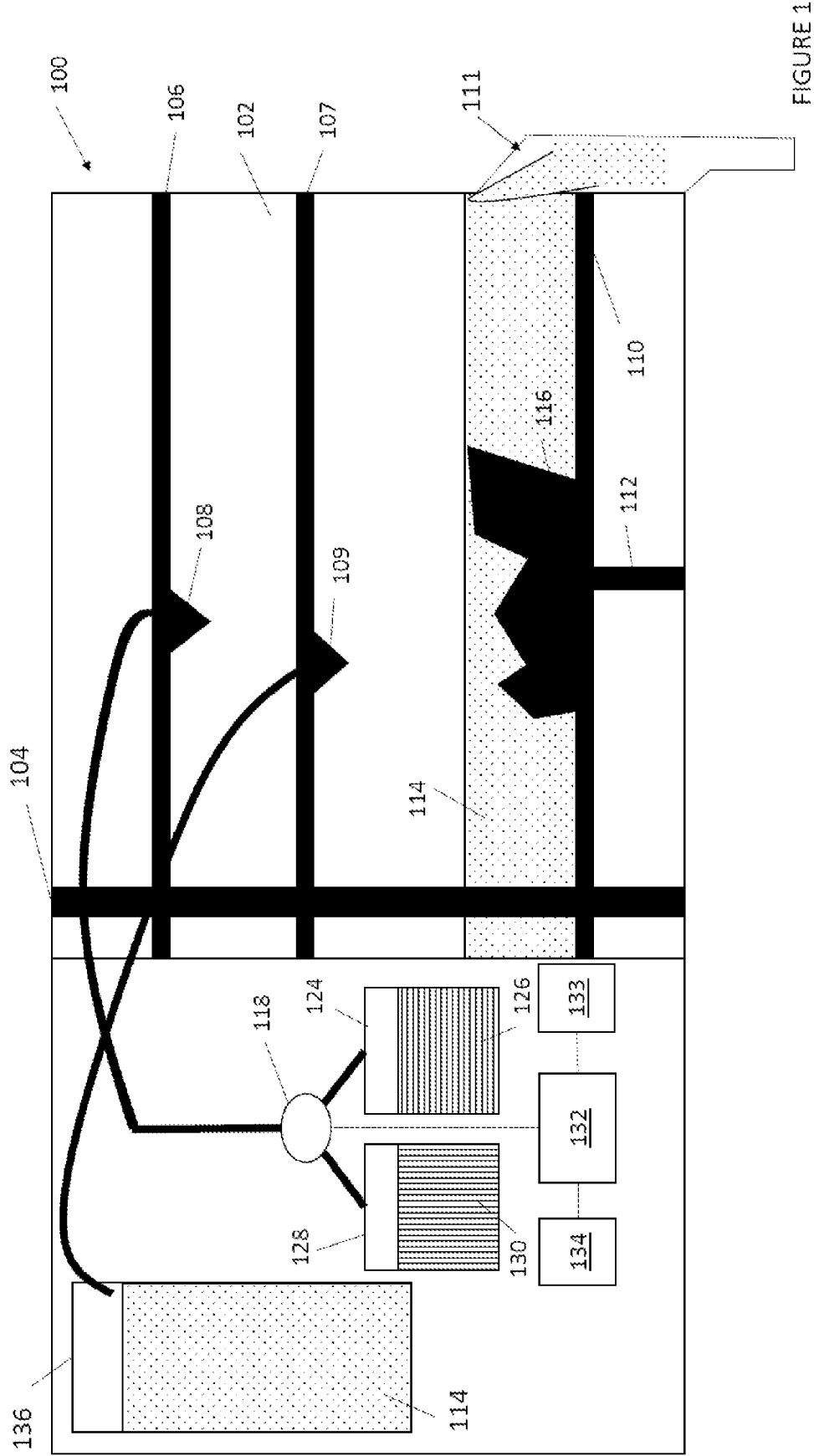
FIG. 1 is a front view of an exemplary additive manufacturing machine with an activator control system in accordance with the present invention.

FIG. 1 illustrates an exemplary additive manufacturing machine 100. The machine 100 may be a 3-D printer, though such is not required. The machine 100 may be configured to operate using binder jetting, though any type of additive manufacturing is contemplated.

The machine 100 may comprise a build box 102. The build box 102 may be any size or shape. A vertical movement device 104 may be located within the build box 102. A horizontal movement device 106 may be located within the build box 102. A deposit device 108 may be mounted to the horizontal movement device 106. The horizontal movement device 106 may be connected to the vertical movement device 104. In other exemplary embodiments, the deposit device 108 may be mounted to the vertical movement device 104 and the vertical movement device 104 may be mounted to the horizontal movement device 106. The vertical movement device 104 may be configured to control vertical movement of the horizontal movement device 106 and/or the deposit device 108. The horizontal movement device 106 may be configured to control horizontal movement of the vertical movement device 104 and/or the deposit device 108. For example, without limitation, the vertical and horizontal movement devices 104 and 106 may comprise tracks, motors, belts, gears, some combination thereof, or the like. The deposit device 108 may comprise a nozzle, a print head, a valve, some combination thereof, or the like.

A recoater 109 may be provided. The recoater 109 may be mounted to a second horizontal movement device 107. The second horizontal movement device 107 may be mounted to the vertical movement device 104, though in other exemplary embodiments the second horizontal movement device 107 may be mounted to a second, and independent vertical movement device. In other exemplary embodiments, the recoater 109 may be mounted to the vertical movement device 104, or the second independent vertical movement device, which may be mounted to the second horizontal movement device 107. The second horizontal movement device 107 may comprise tracks, motors, belts, gears, some combination thereof, or the like. The recoater 109 may comprise a nozzle, a print head, a valve, some combination thereof, or the like.

The recoater 109 may be in fluid communication with a build material reservoir 136. The build material reservoir 136 may comprise a build material 114. The build material 114 may comprise, for example without limitation, sand or aggregate, though any type of material is contemplated. In other exemplary embodiments, the deposit device 108 may be in fluid communication with the build material reservoir 136. In such embodiments, the recoater 109 may not be required as the deposit device 108 may essentially serve as the recoater 109.

A build platform 110 may be located within the build box 102. The build platform 110 may be connected to a platform movement device 112 which may permit vertical and/or horizontal movement of the build platform 110. The platform movement device 112 may comprise tracks, motors, belts, gears, some combination thereof, or the like. In exemplary embodiment's, the build platform 110 may have substantially the same footprint as the build box 102, though any size or shape is contemplated.

The deposit device 108 may be in fluid communication with a first reservoir 124. The first reservoir 124 may comprise a binder 126. The deposit device 108 may be in fluid communication with a second reservoir 128. The second reservoir 128 may comprise an activator 130. In exemplary embodiments, the first reservoir 124, the second reservoir 128, and/or the build material reservoir 136 may comprise one or more heating elements, cooling elements, mixing device, some combination thereof, or the like.

A control device 118 may be interposed between the second reservoir 128 and the deposit device 108. In exemplary embodiments, the control device 118 may also be interposed between the first reservoir 124 and the deposit device 108, though such is not required. The control device 118 may comprise a valve, filter, pump, some combination thereof, or other mechanism(s) configured to limit or otherwise control the amount of activator 130 moved from the second reservoir 128 to the deposit device 108. The control device 118 may be further configured to control the amount of binder 126 moved from the first reservoir 124 to the deposit device 108, though such is not required.

The control device 118 may be in electronic communication with a controller 132. The controller 132 may be in electronic communication with one or more humidity sensors 134. The humidity sensors 134 may be configured to take readings of the ambient humidity levels.

The controller 132 may be in electronic communication with one or more electronic storage devices 133. The electronic storage devices 133 may comprise data indicating one or more amounts, densities, concentrations, some combination thereof, or the like of activator 130 to be deposited, each of which may be associated with one or more humidity levels or ranges.

The controller 132 may be in electronic communication with one or more of: the vertical movement device 104, the horizontal movement device 106, the deposit device 108, the platform movement device 112, the second horizontal movement device 107, and the recoater 109. The controller 132 may be configured to accept one or more computer aided design ("CAD") files and control movement of the depositing device 108, the recoater 109, and/or the build platform 110 to control the location the build material 114, the activator 130, and/or the binder 126 is deposited to form an object 116. Movement of the depositing device 108 may be controlled by way of the vertical and/or horizontal movement devices 104, 106. Movement of the recoater 109 may be controlled by way of the vertical and/or second horizontal movement devices 104, 107. Movement of the build platform 110 may be controlled by way of the platform movement device 112.

A drainage system 111 may be provided in fluid communication with some or all of the build box 102. In exemplary embodiments, the drainage system 111 comprises one or more drains provided around some or all of the build box 102. The drainage system 111 may facilitate the drainage of remaining build material 114, i.e., the unbound build material 114 not coated with the binder 126 and/or forming the object 116.

Figure 2:
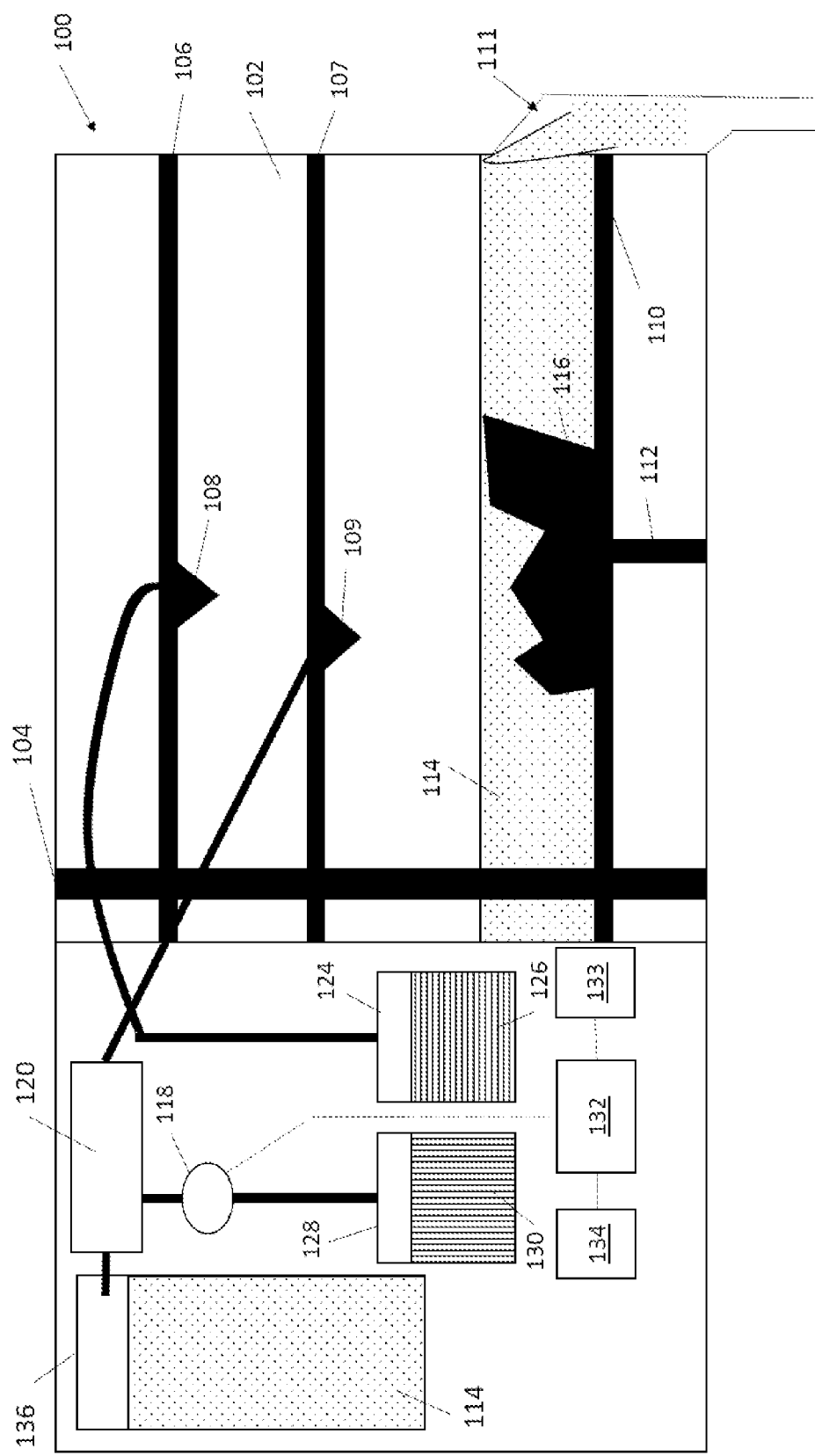
FIG. 2 is a front view of another exemplary additive manufacturing machine with an activator control system in accordance with the present invention.

FIG. 2 illustrates another exemplary embodiment of the additive manufacturing machine 100. The control device 118 may be interposed between the second reservoir 128 and the recoater 109 such that the activator 130 may be mixed with the build material 114 prior to deposit. Such mixing may occur at a mixing chamber 120, though such is not required. The mixing chamber 120 may comprise one or more heating elements, cooling elements, mixing device, some combination thereof, or the like. The first reservoir 124 may be in fluid communication with the deposit device 108.

The various reservoirs, such as but not limited to the first reservoir 124, the second reservoir 128, and the build material reservoir 136, described herein may be located remote from the build box 102 and be connected thereto by way of one or more tubes, pipes, valves, passageways, ductwork, some combination thereof, or the like. Various other components, such as but not limited to the controller 132, the control device 118, the mixing chamber 120, the humidity sensors 134, and the database 133 may be located remote from the build box 102 and be in physical or electrical connection with the build box 102. Any component described herein may be located remote from one another.

Figure 3:
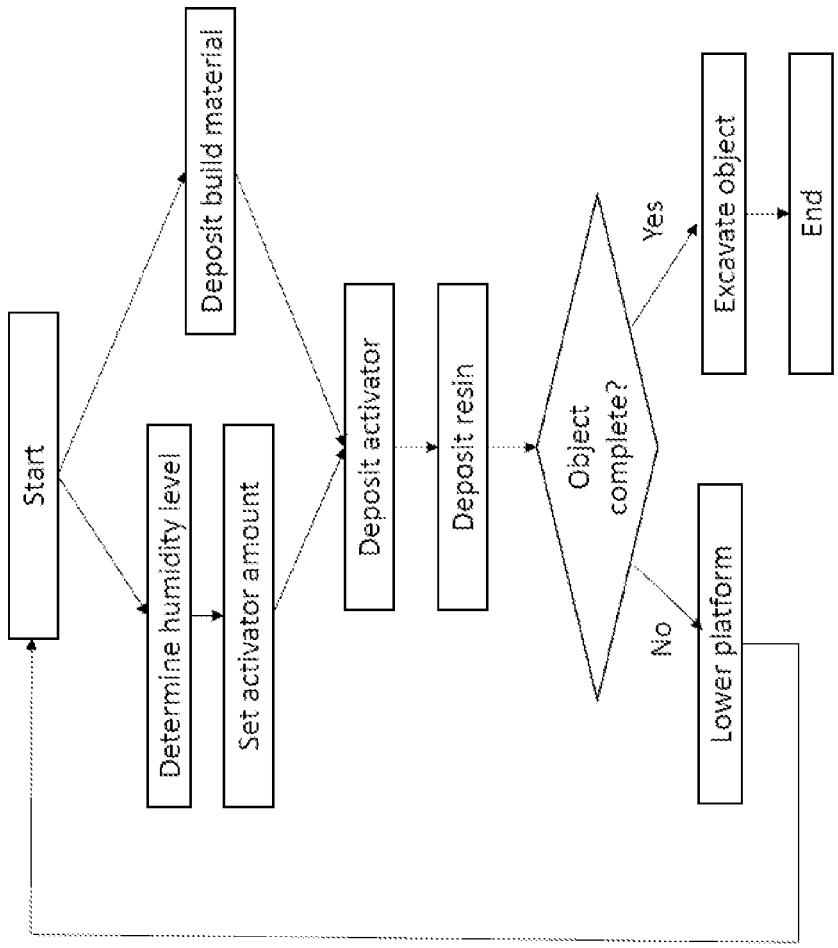
FIG. 3 is a flowchart with exemplary logic for operating the additive manufacturing machine of FIG. 1.

FIG. 3 illustrates exemplary logic for operating the additive manufacturing machine 100. The build material 114 may be placed within the build box 102. The build material 114 may be deposited by the deposit device 108, the recoater 109, be pre-deposited, some combination thereof, or the like. In exemplary embodiments, the build material 114 is deposited on the build platform 110.

At the same time, or after the build material 114 has been deposited, the controller 132 may be configured to take one or more humidity readings from the humidity sensor 134. Where more than one humidity sensor 134 is utilized, the controller 132 may be configured to take an average of, or otherwise combine or select a single one of, the various humidity level readings. The controller 132 may be configured to look up, at the electronic storage device 133, the amount, density, concentration, type, ingredients, properties, combinations thereof, or the like of activator 130 to be deposited based upon the humidity readings from the humidity sensor 134. In exemplary embodiments, the controller 132 may transmit the humidity level determined by the humidity sensor 134 to the electronic storage device 133 and the electronic storage device may retrieve and transmit the corresponding activator 130 amount, density, concentration, type, ingredients, properties, combinations thereof, or the like to be used.

The controller 132 may be configured to transmit commands to the control device 118 to cause the retrieved amount, density, concentration, some combination thereof, or the like of the activator 130 to be deposited on the deposited build material 114. Deposit of the activator 130 may be made by way of the deposit device 108. In such embodiments, the activator 130 may be deposited over the entire build box 102 and allowed to soak into the deposited build material 114 such that substantially all of the deposited build material 114 is soaked with activator 130. In other exemplary embodiments, the deposit of the activator 130 may be made at the mixing chamber 120 or otherwise with the build material 114 prior to deposit within the build box 102.

The controller 132 may be configured to cause the binder 126 to be deposited on the areas of the build material 114 corresponding to portions of the object 116 being formed. The binder 126 is preferably deposited after the activator 130 is deposited on the build material 114 and allowed to soak into the build material 114, though any timing is required.

If the object 116 is not yet completed, the build platform 110 may be lowered and an additional layer of the build material 114 may be deposited. Preferably, the build material 114 is deposited by the recoater 109 from material in the build material reservoir 136. The remaining build material 114, i.e., the unbound build material 114 not forming the object 116, may be allowed to flow into the drainage system 111. In this way, the remaining build material 114 may be continuously removed from the build box 102. Alternatively, or additionally, the drainage system 111 may only be accessed once the object 116 is wholly or partially completed.

The amount of activator 130 to be deposited may be selected or programmed into the electronic storage device 133 such that the remaining build material 114 may flow through the drainage system 111. If the amount of activator 130 deposited is too low, the build material 114 may continuously flow into the drainage system 111 or elsewhere such that the object 116 is not properly formed. If the amount of activator 130 deposited is too high, the remaining build material 114 may clump and may not drain and/or may be difficult to excavate. This may then require manual excavation efforts and/or may result in damage to the object 116. In exemplary embodiments, the drainage system 111 may be in fluid communication with the build material reservoir 118 such that the remaining build material 114 may be reused.

Moisture in the air may act as an activator. As such, increased ambient humidity levels result in a lower requirement of activator 130 because the moisture in the air may act as part of the needed activator 130. For example, the increased humidity may cause the build material 114 to not require as much activator 130 to prevent unintentional drainage into the drainage system 111. Likewise, decreased ambient humidity levels may require more activator 130 as the lack of moisture in the air. For example, more activator 130 may be required to prevent the build material 114 from unintentional and/or premature drainage. The amount of activator 130 to be used for a given humidity level and/or range may be selected to optimize the flow rate of the remaining build material 114 into the drainage system 111, through other components of the system 100, properties of the object 116 being created, combinations thereof, or the like.

If the object 116 is completed, the object 116 may be excavated as needed from any remining, excess build material 114. Such excavation efforts may include, but are not necessarily limited to, drainage of the remaining build material 114 through the drainage system 111. Alternatively, or additionally, such drainage and/or excavation may occur or be performed throughout the build process.

While discussion is made herein primarily with regards to binder jetting, other types of additive manufacturing are contemplated. The fluid communication described herein may be achieved by one or more tubes, pipes, valves, joints, ductwork, some combination thereof, or the like. Any components of the machine 100 may be local to, or remote from, the machine 100 and particularly the build box 102.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

Certain operations described herein may be performed by one or more electronic devices. Each electronic device may comprise one or more processors, electronic storage devices, executable software instructions, and the like configured to perform the operations described herein. The electronic devices may be general purpose computers or specialized computing device. The electronic devices may be personal computers, smartphone, tablets, databases, servers, or the like. The electronic connections and transmissions described herein may be accomplished by wired or wireless means.

What is claimed is:

1. A method for providing humidity compensation for additive manufacturing, said method comprising the steps of:
depositing build material in a build box in an automated fashion by way of an additive manufacturing machine;
electronically receiving data from a humidity sensor at a controller for the additive manufacturing machine indicating an ambient humidity level;
electronically commanding, by way of the controller, a control device to permit extraction of an amount of activator from a first reservoir based on said ambient humidity level;
depositing, in an automated fashion, said activator on at least portions of said build material in said build box by way of the additive manufacturing machine;
electronically commanding, by way of the controller, extraction of resin from a second reservoir; and
depositing, in an automated fashion, said extracted resin at areas of said build material in said build box consistent with a shape of an object to be created by way of the additive manufacturing machine.

2. The method of claim 1 further comprising the steps of:
electronically receiving further data from said humidity sensor at the controller indicating an increase in ambient humidity levels; and
electronically commanding, by way of said controller, said control device to decrease extraction of said activator from said first reservoir.

3. The method of claim 1 further comprising the steps of:
electronically receiving further data from said humidity sensor at the controller indicating a decrease in ambient humidity levels; and
electronically commanding, by way of said controller, said control device to permit increased extraction of said activator from said first reservoir.

4. The method of claim 1 further comprising the steps of:
extracting said build material from a third reservoir, wherein said build material is deposited within said build box by way of a deposit device of said additive manufacturing machine in an automated fashion; and
draining leftover build material from said build box by way of a drainage system of said additive manufacturing machine.

5. The method of claim 4 wherein:
said activator is deposited within said build box by way of an additional deposit device of said additive manufacturing machine in an automated fashion; and
said resin is deposited by way of said additional deposit device of said additive manufacturing machine in an automated fashion.

6. The method of claim 4 further comprising the steps of:
mixing, by way of a mixing device, said activator with said build material prior to deposit within said build box in an automated fashion.

7. The method of claim 1 further comprising the steps of:
querying, by way of said controller, a database with said ambient humidity level to retrieve the amount of activator.

8. The method of claim 1 further comprising the steps of:
lowering a build platform of said additive manufacturing machine within said build box in an automated fashion.

9. An additive manufacturing system with humidity compensation, said system comprising:
a first reservoir for activator;
a second reservoir for binder;
a third reservoir for build material;
a build box;
one or more deposit devices, each located within said build box and fluidly connected to at least one of said first, second, and third reservoirs such that each of said first, second, and third reservoirs is fluidly connected to at least one of said one or more deposit devices;
a control device associated with said first reservoir and configured to control an amount of activator removed from said first reservoir;
a humidity sensor;
a controller in electronic communication with said control device and said humidity sensor, wherein said controller comprises software instructions, which when executed, configure said controller to:
receive data indicating an ambient humidity level from said humidity sensor; and
command said control device to permit removal of an amount of activator from said first reservoir based on said ambient humidity level.

10. The system of claim 9 wherein:
said control device comprises a valve.

11. The system of claim 9 wherein:
said control device comprises a pump.

12. The system of claim 9 further comprising:
a mixing chamber fluidly interposed between said third reservoir and said first reservoir, wherein said control device is fluidly interposed between said first reservoir and said mixing chamber.

13. The system of claim 9 wherein:
said control device is fluidly interposed between said first reservoir and said second reservoir.

14. The system of claim 9 further comprising:
a database in electronic communication with said controller and comprising humidity levels or ranges, each associated with data representing an amount of activator; and
additional software instructions at said controller, which when executed, configure said controller to query the database with the ambient humidity level received from the humidity sensor to retrieve a corresponding amount of activator, wherein said controller is configured to command said control device to permit removal of the amount of activator from the first reservoir consistent with the corresponding amount of activator.

15. The system of claim 9 further comprising:
additional software instructions at said controller, which when executed, configure said controller to:
command said control device to increase the amount of activator permitted to be removed from the first reservoir upon receipt of data from said humidity sensor indicating a decrease in ambient humidity levels; and
command said control device to decrease the amount of activator permitted to be removed from the first reservoir upon receipt of data from said humidity sensor indicating an increase in ambient humidity levels.

16. The system of claim 9 further comprising:
a drainage system fluidly connected to said build box.

17. The system of claim 9 wherein:
each of said one or more deposit devices is moveably mounted to one or more vertical and horizontal movement devices.

18. The system of claim 9 further comprising:
a build platform configured for vertical movement within said build box.

19. The system of claim 9 wherein:
said humidity sensor is located at said build box or other portion an additive manufacturing machine comprising at least said build box, said first reservoir, said second reservoir, said third reservoir, said one or more deposit device, and said control device.

20. An additive manufacturing system with humidity compensation, said system comprising:
a first reservoir for activator;
a second reservoir for binder;
a third reservoir for build material;
a mixing chamber fluidly interposed between said first reservoir and said third reservoir;
a build box;
a build platform configured for vertical movement within said build box;
a drainage system fluidly connected to said build box and configured to permit the selective extraction of build material from said build box;
one or more deposit devices, each located within said build box, moveably mounted to one or more vertical and horizontal movement devices, and fluidly connected to at least one of said second reservoir and said mixing chamber such that each of said second reservoir and said mixing chamber are fluidly connected to at least one of said one or more deposit devices;
a control device fluidly connected to said first reservoir and configured to control an amount of activator removed from said first reservoir;
a humidity sensor located at, or adjacent to, the build box;
a database comprising humidity levels or ranges, each associated with data representing an amount of activator, wherein said amount of activator is selected to prevent premature drainage of materials deposited within said build box while an object is under construction within said build box; and
a controller in electronic communication with said control device, said database, and said humidity sensor, wherein said controller comprises software instructions, which when executed, configure said controller to:
receive data indicating an ambient humidity level from said humidity sensor;
query the database with the ambient humidity level received from the humidity sensor to retrieve a corresponding amount of activator;
command said control device to permit removal of an amount of activator from said first reservoir and into said mixing chamber for mixture with said build material prior to deposit within said build box based on said ambient humidity level;
command said control device to change operating status to permit removal of an increased amount of activator from the first reservoir upon receipt of subsequent data from said humidity sensor indicating a decrease in ambient humidity levels; and
command said control device to change operating status to permit removal of a decreased amount of activator from the first reservoir upon receipt of subsequent data from said humidity sensor indicating an increase in ambient humidity levels.

* * * * *